United States Patent
Akbari et al.

(10) Patent No.: US 11,649,762 B2
(45) Date of Patent: May 16, 2023

(54) GAS TURBINE POWER GENERATION SYSTEMS USING HYDROGEN-CONTAINING FUEL PRODUCED BY A WAVE REFORMER AND METHODS OF OPERATING SUCH SYSTEMS

(71) Applicant: New Wave Hydrogen, Inc., Calgary (CA)

(72) Inventors: Pejman Akbari, Pasadena, CA (US); Colin D. Copeland, Pitt Meadows (CA); Kathleen M. O'Neil, Durham, NC (US)

(73) Assignee: New Wave Hydrogen, Inc., Calgary (CA)

( * ) Notice: Subject to any disclaimer, the term of this patent is extended or adjusted under 35 U.S.C. 154(b) by 0 days.

(21) Appl. No.: 17/307,621

(22) Filed: May 4, 2021

(65) Prior Publication Data
US 2021/0348557 A1     Nov. 11, 2021

Related U.S. Application Data

(60) Provisional application No. 63/020,754, filed on May 6, 2020.

(51) Int. Cl.
| F02C 3/22 | (2006.01) |
| F23R 3/28 | (2006.01) |
| F23R 3/00 | (2006.01) |

(52) U.S. Cl.
CPC ............... *F02C 3/22* (2013.01); *F23R 3/005* (2013.01); *F23R 3/28* (2013.01); *F05D 2220/32* (2013.01); *F05D 2240/35* (2013.01)

(58) Field of Classification Search
CPC .... F02C 3/22; F02C 3/28; F23R 3/005; F23R 3/28; F05D 2220/32; F05D 2240/35
See application file for complete search history.

(56) References Cited

U.S. PATENT DOCUMENTS

| 2,832,665 A | 4/1958 | Hertzberg et al. |
| 2,832,666 A | 4/1958 | Hertzberg et al. |

(Continued)

FOREIGN PATENT DOCUMENTS

| CA | 2930838 | 5/2015 |
| WO | WO2016001476 | 1/2016 |

(Continued)

OTHER PUBLICATIONS

EP Appln. No. 18747576.9—Extended European Search Report dated Jan. 11, 2021.

(Continued)

*Primary Examiner* — Steven M Sutherland
(74) *Attorney, Agent, or Firm* — Davidson Berquist Jackson & Gowdey LLP

(57) ABSTRACT

An improved power generation system and methods of its operation are provided, wherein the system combines: (i) a wave reformer, (ii) an optional second wave rotor, and (iii) a gas turbine in a flexible range of novel designs. Such a hybrid power generation system can thermally crack or decompose hydrocarbon fuel to produce a high-pressure fuel product, including mainly hydrogen and lead to a higher thermal efficiency than existing engines with low to no direct emission footprint.

19 Claims, 10 Drawing Sheets

(56) References Cited

U.S. PATENT DOCUMENTS

| | | | |
|---|---|---|---|
| 2,902,337 A * | 9/1959 | Hertzberg | B01J 3/08 |
| | | | 137/154 |
| 2,942,413 A * | 6/1960 | Corbett | F02C 7/16 |
| | | | 60/260 |
| 2,987,873 A * | 6/1961 | Fox | F02C 3/305 |
| | | | 60/233 |
| 3,235,341 A | 2/1966 | Hansel | |
| 3,254,960 A * | 6/1966 | Hansel | C07C 45/38 |
| | | | 585/539 |
| 3,262,757 A | 7/1966 | Bodmer | |
| 3,272,598 A * | 9/1966 | Hansel | B01J 3/08 |
| | | | 585/539 |
| 3,307,917 A * | 3/1967 | Hansel | C01C 3/0208 |
| | | | 585/539 |
| 3,307,918 A * | 3/1967 | Bodmer | C07C 2/76 |
| | | | 585/539 |
| 3,355,256 A | 11/1967 | Hansel | |
| 3,503,713 A | 3/1970 | Hansel | |
| 3,998,711 A | 12/1976 | Hertzberg et al. | |
| 4,160,813 A | 7/1979 | Markel | |
| 5,125,793 A * | 6/1992 | MacArthur | F02K 9/68 |
| | | | 415/114 |
| 5,300,216 A | 4/1994 | Hertzberg et al. | |
| 7,752,848 B2 | 7/2010 | Balan et al. | |
| 7,802,434 B2 | 9/2010 | Vartharajan et al. | |
| 7,802,484 B2 | 9/2010 | Pankratz et al. | |
| 9,365,775 B1 | 6/2016 | La Crosse | |
| 10,195,574 B2 | 2/2019 | Bedard et al. | |
| 10,384,180 B2 | 8/2019 | Knowlen et al. | |
| 2005/0072152 A1 | 4/2005 | Suzuki et al. | |
| 2009/0133400 A1* | 5/2009 | Callas | F02C 7/224 |
| | | | 60/730 |
| 2010/0249468 A1 | 9/2010 | Perkins | |
| 2011/0060178 A1 | 3/2011 | Nafis et al. | |
| 2013/0048486 A1 | 3/2013 | Castillo et al. | |
| 2013/0192321 A1 | 8/2013 | Cheily | |
| 2014/0243569 A1 | 8/2014 | Seppala et al. | |
| 2014/0328749 A1 | 11/2014 | Hammel | |
| 2018/0215615 A1 | 8/2018 | Kielb | |
| 2018/0355794 A1* | 12/2018 | Bulat | F02C 6/003 |
| 2021/0348557 A1 | 11/2021 | Akbari et al. | |

FOREIGN PATENT DOCUMENTS

| | | |
|---|---|---|
| WO | WO2018144595 | 8/2018 |
| WO | WO 2020/118417 | 6/2020 |

OTHER PUBLICATIONS

Akbari, P. et al., Numerical Simulation and Design of a Combustion Wave Rotor for Deflagrative and Detonative Propagation, 42nd AIAA Joint Propulsion Conference, Jul. 2006.

Moshrefi, M. et al., Methane Conversion to Hydrogen and Carbon Black by DC-Spark Discharge, Plasma Chem Plasma Process (2012) pp. 1167-1168.

Akbari, P. et al., Review of Recent Developments in Wave Rotor Combustion Technology, Journal of Propulsion and Power, vol. 25, No. 4, July-Aug. 2009 pp. 833-844.

Akbari, P., Nalim, M.R., and Muller, N., "A Review of Wave Rotor Technology and Its Applications," ASME Journal of Engineering for Gas . . . vol. 128, No. 4, pp. 788-785 (1996).

Wilson, J. and Paxson, D.E., "Wave Rotor Optimization for Gas Turbine Topping Cycles," Journal of Propulsion and Power, vol. 12, No. 4, pp. 778-785 (1996).

Jones, S.M. and Welch, G.E., "Performance Benefits for Wave Rotor Topped Gas Turbine Engines," ASME, 41st Turbo Expo '96, Birmingham, UK (Jun. 10-13, 1996).

Zehnder, G. et al. "Comprex® Pressure-Wave Supercharging for Automotive Diesels . . . " SAE Technical Paper Series 840132, International Congress & Exposition, (2/27-3/2 1984).

Akbari, P. et al., "Performance Enhancement of Microturbine Engines . . . " ASME Journal of Engineering for Gas Turbines and Power, vol. 128, No. 1, pp. 190-202 (2006).

Welch, G.E., Jones, S.M., and Paxson, D.E., "Wave Rotor-Enhanced Gas Turbine Engines," Journal of Engineering for Gas Turbines and Power, vol. 119, No. 2, pp. 469-477 (1997).

Snyder, P. et al., "Assessment of a Wave Rotor Topped Demonstrator Gas Turbine . . . " ASME Paper 96-GT-41, International Gas Turbine . . . Birmingham, UK (Jun. 10-13, 1996).

Toulson, E., Schock, H., and Attard, W., "A Review of Pre-Chamber Initiated Jet Ignition Combustion Systems," SAE Technical Paper 2010-01-2263 (2010).

J.L. Lauer et al., "Continuous Shock Wave Reactor For Chemical Production and Reaction Studies," 22 Chem. Eng. Sci. 209-215 (1967).

P.H. Rose, "Potential Applications of Wave Machinery to Energy and Chemical . . . ," Proceedings of the 12th Int'l Symposium of Shock Tubes and Waves, Jerusalem, Israel (1979).

E.L. Klosterman et al., "The Use of an Unsteady Wave Chemical Reactor . . . Fuel Production," Proceedings of the 12th Int'l Symposium of Shock Tubes and Waves . . . , Israel (1979).

W.H. Christiansen et al., "Wave Machinery for Chemical Processing and High-Efficiency . . . ," Proceedings of the 20th Int'l Symposium on Shock Waves, Pasadena, CA (Jul. 1995).

Jurrian van der Dussen et al., "Design of a Process to Manufacture Ethylene From Ethane By Means of a Shock Wave Reactor," Delft Univ. of Technology (Jun. 2, 2006).

Marco W.M. van Goethem et al., "Ideal Chemical Conversion Concept for the Industrial Production . . . ," 46 Ind. Eng. Chem. Res. 4045-4062 (2007) (published on Web Oct. 13, 2006).

Erdin Kocak, "Embedding of Shock Wave Reactor in Thermal Cracking Process for Ethylene," Delft Univ, of Technology, Dept, of Chemical Technology and Material Science (May 2007).

A. Hertzberg, "Nitrogen Fixation for Fertilizers by Gasdynamic Techniques," Proceedings of the 10th Int'l Symposium on Shock Tubes, Kyoto, Japan (1975).

A.T. Mattick et al., "Shock-Controlled Chemical Processing," Proceedings of the 19th Int'l Symposium on Shock Waves, Marseille, France (Jul. 1993).

L. Nill et al., "Design of a Supersonic Steam Tunnel for Use As a Shock Wave Reactor," AIAA 95-0016, 33rd Aerospace Sciences Meeting and Exhibit, Reno, NV (Jan. 1995).

Robert K. Masse, "Fluid Dynamics of the Shock Wave Reactor," Ph.D Thesis, Univ. of Washington, (2000).

C. Knowlen et al., "Petrochemical Pyrolysis With Shock Waves," AIAA 95-0402, 33rd Aerospace Sciences Meeting and Exhibit, Reno, NV (Jan. 1995).

A.T. Mattick et al., "Pyrolysis of Hydrocarbons Using a Shock Wave Reactor," Paper 3800, 21st Symposium on Shock Waves, Great Keppel Island, Australia (Jul. 1997).

PCT/IB2021/000305—ISR dated Aug. 25, 2021.

PCT/IB2021/000305—Written Opinion dated Aug. 25, 2021.

PCT/CA2021/051789—ISR dated Mar. 8, 2022.

PCT/CA2021/051789—Written Opinion dated Mar. 8, 2022.

Muradov, Thermocatalytic CO2-Free Production of Hydrogen From Hydrocarbon Fuels, Proceedings of the 2000 Hydrogen Program review, NREL/CP-50-28890 (2000).

Carpenter, J.E., et al., An Existing Facility for SCRAM-JET Testing—The Wave Superheater, AIAA Journal, pp. 1701-1702, 1967.

Kielb, R., et al., Wave Rotors for Continuous, Vitiate-Free, High-Enthalpy Test Gas Generation, ,ACENT Labgoratories LLC, Hampoton, VA, Dec. 29014.

Carpenter, J.E., et al., "Wave Superheated Hypersonic Tunnel," Semiannual Report No. AD-1345-W-7, Cornell Aeronautical Laboratory, Buffalo, NY 1962.

Fang, Z., et al., Production of Hydrogen from Renewable Resources,: 2015.

Muradov, N., "Low to Near-Zero CO2 Production of Hydrogen from Fossil Fuels: Status and perspectives," Int J Hydrogen Energy, 2017, vol. 42, No. 20, p. 14058-88.

Tuchler et al., Validation of a Numerical . . . with Curved Channels, J. of Eng. for Gas Turbines & Power, 2020, vol. 142, No. 2, pp. 021017.

(56) References Cited

OTHER PUBLICATIONS

Muradov, Thermocatalytic CO2-Free Production of Hydrogen From Hydrocarbon Fuels, Proceedings of the 2000 Hydrogen Program Review, NREL/CP-570-28890 (2000).

Randy Vander Wal and Mpila Makiesse Nkiawete, "Carbons as Catalysts in Thermo-Catalytic Hydrocarbon Decomposition: A Review," 6 J. Carbon Res. 23, doi:10.3390/c6020023.

Mondal, K. C., Chandran, S. R., "Evaluation of the Economic Impact of Hydrogen . . . Reforming of Methane Process," Int J Hydrogen Energy, 2014, vol. 39, No. 18, pp. 9670-9674.

Abanades, A., "Low Carbon Production of Hydrogen by Methane Decarbonization," Chapter 6 in Production of Hydrogen from Renewable Resources, 2015, Springer, pp. 149-177.

Holmen, A., Olsvik, O., and Rokstad, O. A., "Pyrolysis of Natural Gas: Chemistry and Process Concepts," Fuel Process. Technol., 1995, vol. 42, pp. 249-267.

Gyarmathy, G., "How Does the Comprex Pressure-Wave Supercharger Work?," SAE Paper 830234, 1983.

Mohammad Mahdi Moshrefi et al., "Methane Conversion to Hydrogen and Carbon Black by DC-Spark Discharge," Plasma Chemistry and Plasma Processing . . . , vol. 32, No. 6, Sep. 9, 2012.

Akbari, P et al., "Shock Wave Heating: A Novel Method for Low-Cost Hydrogen Production," ASME 2021 International Mechanical Engineering Congress, Nov. 2021.

PCT/CA2022/050645 Notification of Transmittal of ISR & Written Opinion, dated Jul. 15, 2022.

PCT/CA2022/050645, Written Opinion of the ISA, dated Jul. 15, 2022.

PCT/CA2022/050645, International Search Report, dated Jul. 15, 2022.

\* cited by examiner

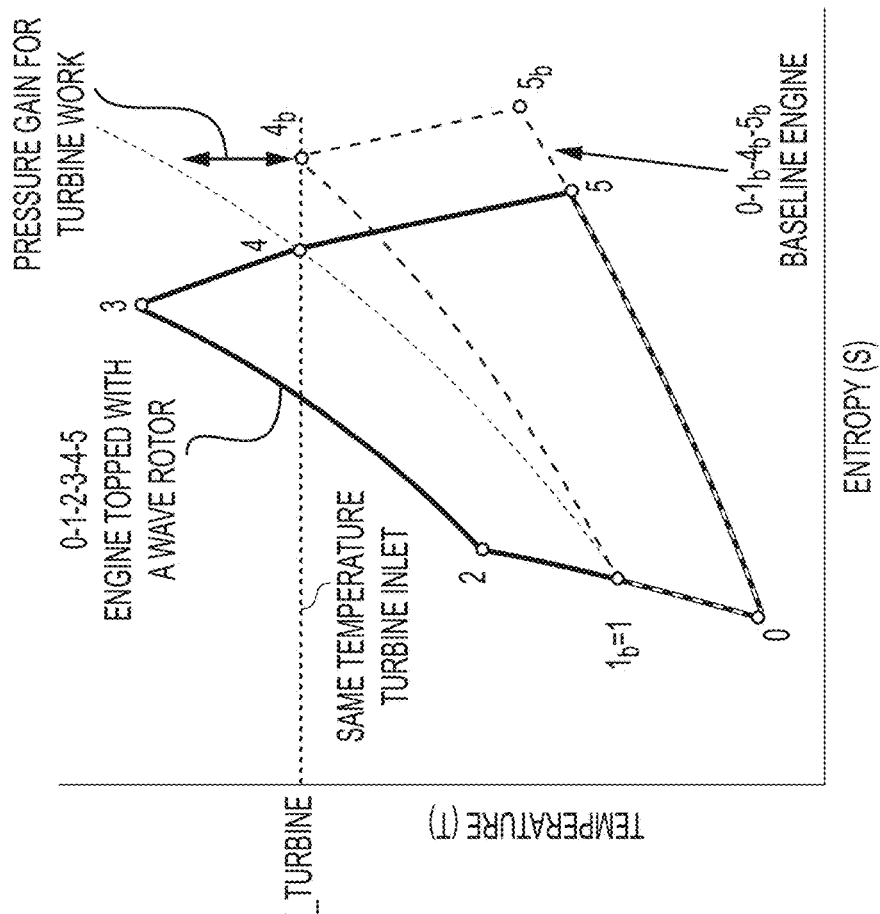
FIG. 1B *(PRIOR ART)*
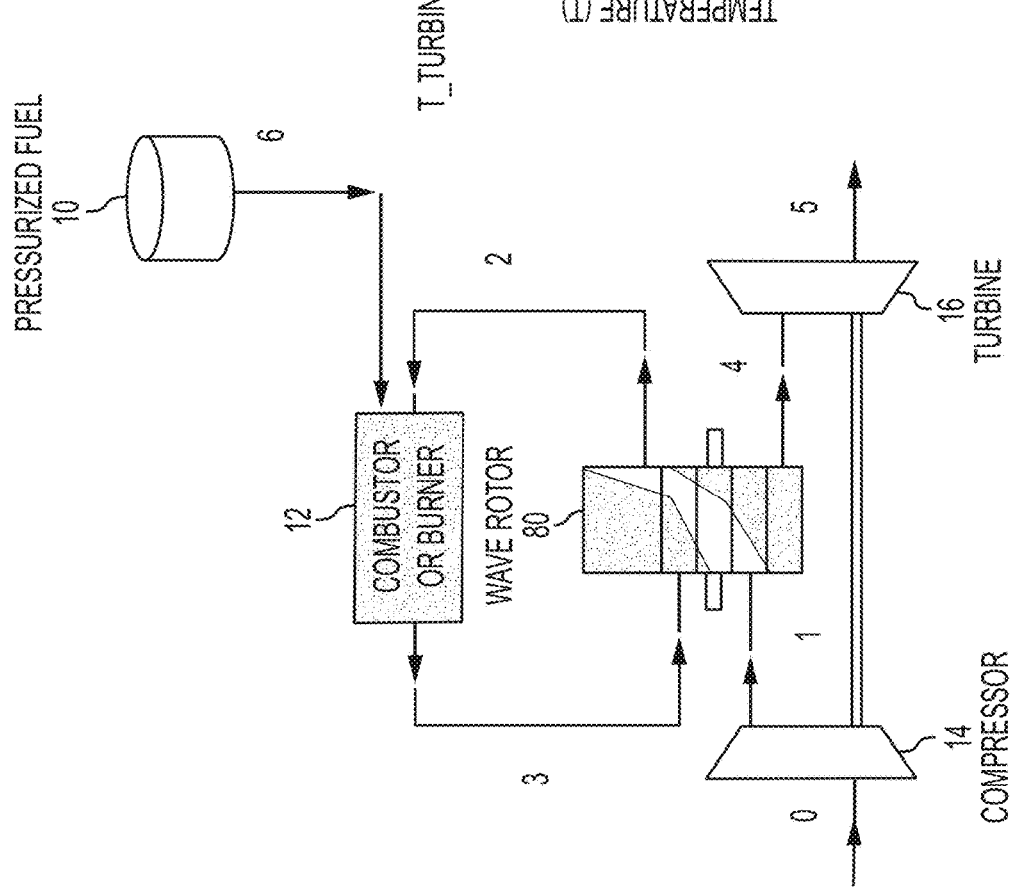
FIG. 1A *(PRIOR ART)*

GAS TURBINE POWER GENERATION SYSTEMS USING HYDROGEN-CONTAINING FUEL PRODUCED BY A WAVE REFORMER AND METHODS OF OPERATING SUCH SYSTEMS

CROSS-REFERENCE TO RELATED APPLICATION

This application claims priority to U.S. Provisional Application No. 63/020,754, filed May 6, 2020, which is incorporated herein by reference in its entirety.

BACKGROUND OF THE INVENTION

1. Field of the Invention

The present invention relates generally to power generation systems that include a wave reformer that will thermally crack or decompose fuel sources, such as hydrocarbon fuels, to produce fuel products containing mainly hydrogen (e.g., a fuel product containing hydrogen, any unconverted fuel that has not been thermally cracked or decomposed to hydrogen, and any byproducts such as solid particles) for producing fuel to be supplied to a turbine, and thereby provide a higher thermal efficiency than existing engines with low to no direct emission footprint, and to methods of operating such systems.

2. Description of Related Art

Wave reformers that are suitable for use in the present invention have been disclosed in published U.S. Patent Application Publication US 2018/0215615 A1, entitled "Hydrocarbon wave reformer and Methods of Use," published Aug. 2, 2018, and assigned to Standing wave reformer LLC (now assigned to New Wave Hydrogen, Inc.); the entire disclosure of which is hereby incorporated by reference. A description may also be found on the website www.NewWaveH2.coin.

A variety of other wave rotor devices that can be used in a wide range of applications have previously been disclosed. (See, Akbari, P., Nalim, M. R., and Müller, N., "A Review of Wave Rotor Technology and Its Applications" ASME Journal of Engineering for Gas Turbines and Power, Vol. 128, No. 4, pp. 717-735 (2006)). As discussed in this review paper, the essential feature of a wave rotor is an array of channels arranged around the axis of a cylindrical, rotating drum. As schematically shown in FIG. 2 of the review paper, a wave rotor has a cylindrical rotating drum that rotates between two stationary end plates, each of which has a few ports or manifolds, controlling the fluid flow through the channels. Through rotation, the channel ends are periodically exposed to differing port pressures, initiating compression, and expansion waves within the wave rotor channels. The number of ports and their positions vary for different applications. By carefully selecting their locations and widths to generate and utilize wave processes, a significant and efficient transfer of energy can be obtained between flows in the connected ducts. Thus, pressure is exchanged dynamically between fluids by utilizing unsteady pressure waves. Unlike a steady-flow turbomachine that either compresses or expands the fluid, the wave rotor accomplishes both compression and expansion within a single component. The gap between the end plates and the rotor is kept very small to minimize leakage, but without contact under all operating and thermal expansion conditions.

Wave rotors have been investigated as a topping unit to improve the performance of a gas turbine engine. (See, Wilson, J. and Paxson, D. E., "Wave Rotor Optimization for Gas Turbine Topping Cycles," Journal of Propulsion and Power, Vol. 12, No. 4, pp. 778-785 (1996); Jones, S. M. and Welch, G. E., "Performance Benefits for Wave Rotor Topped Gas Turbine Engines," ASME, 41st Turbo Expo '96, Birmingham, UK (Jun. 10-13, 1996)). The main interest of such a topping unit application is that the thermal efficiency of a gas turbine increases as cycle pressure ratio increases. In the most commonly used method for topping a gas turbine with a wave rotor, the pressure in the combustion chamber of the enhanced engine is increased by the compression ratio of the wave rotor, while the compressor is the same for the baseline engine and the wave-rotor-enhanced engine. This is very similar to how wave rotors are employed as a pressure wave supercharger for supercharging diesel engines. (See, Zehnder, G. and Mayer, A., "Comprex® Pressure-Wave Supercharging for Automotive Diesels—State-of-the-Art," SAE Technical Paper Series 840132, International Congress & Exposition, Detroit, Mich. (Feb. 27-Mar. 2, 1984)).

In a known example of a gas turbine cycle topped with a wave rotor, as schematically represented in FIG. 1A (where the reference numerals 0-6 denote the states of the fluids throughout the process), a burned gas at State 3 from a combustor or burner 12 passed through a wave rotor 80 and delivered at State 4 to a turbine 16 was at a higher pressure than a burned gas entering a turbine in an engine without a topping wave rotor. Consequently, more work could be extracted from the turbine 16 with the wave rotor 80, leading to a higher engine performance as compared to a baseline turbine engine without a topping wave rotor 80. This is shown in FIG. 1B by comparing temperature-entropy (T-s) diagrams of the baseline engine and the corresponding wave-rotor-topped engine for the same turbine inlet temperature. In such an implementation, the pressure gain from the compressor 12 discharge to the turbine 16 inlet ($P_4/P_1$) was directly attributable to adding the wave rotor 80 to the cycle. Even though this method of use provides a high thermal efficiency and specific work and a low value of specific fuel consumption, concerns may be raised relative to the combustor design due to the elevation of combustor pressure and temperature. Operating a combustor under higher pressure and temperature adds challenges in the aerodynamic and mechanical designs of current standard combustors. To address these difficulties, other topping cycles have been proposed, as discussed in Akbari, P., Nalim, M. R., and Müller, N., "Performance Enhancement of Microturbine Engines Topped with Wave Rotors" ASME Journal of Engineering for Gas Turbines and Power, Vol. 128, No. 1, pp. 190-202 (2006).

As discussed above, the number of ports per cycle of operation of a wave rotor 80 depends on the application. FIG. 2 illustrates the wave rotor 80 shown in FIG. 1A in further detail to show how a four-port wave rotor 80 is typically implemented in a gas turbine engine. The pressure difference between a port (87-90) on an endplate (85, 86) and one of multiple channels (shown as channels 84 in FIG. 5 of US 2018/0215615 A1) within the rotor 80 either drives a shock wave that compresses the gas in the channel or an expansion wave that expands the gas in the channel. For a gas turbine application, pressurized air at a State 1 from a compressor 10 enters the rotor 80 through an inlet port 88 on endplate 85 and is compressed further within the channels of the rotor 80 to a higher pressure value. The further compressed pressurized air at State 2 leaves the wave rotor 80 through a high-pressure air outlet port 89 on an endplate 86 and is led to the engine combustor or burner 12, where it undergoes combustion together with a pressurized fuel 10. High-pressure hot-burned gas from the combustor/burner 12 is returned through another inlet port 87 on endplate 85 back to the rotor 80 where it is expanded and transfers its energy to the pressurized air at State 1 previously arriving from the compressor 14. The de-energized hot-burned gas at State 4 is then scavenged out of the rotor 80 through a low-pressure gas outlet port 90 on endplate 86 to a turbine 16.

It is noted that the inlet ports 87 and 88 on endplate 85 for both incoming burned gas at State 3 and pressurized air at State 1, respectively, are located on one side of the drum 80', and outlet ports 90 and 89 on endplate 86 for discharged burned gas at State 4 and further compressed air at State 2, respectively, are located on an opposite side of the drum 80'. Therefore, the rotor channels (channels 84 as shown in FIG. 5 of US 2018/0215615 A1) are periodically washed by hot and cold fluid flows over a single rotor revolution, and rotor wall temperatures will be substantially less than the peak temperature of any combustion gases used to drive the rotor 80. This self-cooling feature of through-flow enables the rotor 80 to operate at mean rotor wall temperatures with peak gas temperatures between 280 to 450° K higher than the turbine 40 inlet temperature. (See, Welch, G. E., Jones, S. M., and Paxson, D. E., "Wave Rotor-Enhanced Gas Turbine Engines," Journal of Engineering for Gas Turbines and Power, Vol. 119, No. 2, pp. 469-477 (1997)).

FIG. 3 demonstrates an exploded view of a known typical four-port wave rotor 80 in a casing 200. The drum 80' includes an array of long axial channels (channels 84 as shown in FIG. 5 of US 2018/0215615 A1) arranged uniformly around its periphery that spin about and together with a shaft 100 at high speed between two stationary endplates 85 and 86 through which the flows of fluids enter and exit the drum 80'. The inlet endplate 85 has two inlet ports 87 and 88 (not shown but indicated in FIG. 2) that are connected to two inlet ducts 101 and 102, respectively, and the exit endplate 86 has two outlet or exhaust ports 89 and 90 (not shown but indicated in FIG. 2) that are connected to two exhaust ducts 103 and 104, respectively. The entry and exit endplates 85 and 86 function as valves for each rotating channel A series of unsteady compression and expansion waves are formed in the channels as they periodically rotate past the inlet and exit ports, and regions where the endplate is closed. The closed portions of the endplates also cause wave reflections that further change the gas pressure in the channels. Rotational motion of the drum 80' of the wave rotor 80 gives precise control of the wave processes. Gaps between the drum 80' and the faces of the endplates 85 and 86, as shown in FIG. 3, are exaggerated for clarity, but in practice the gap is kept very small to minimize gas leakage, or the endplates 85 and 86 may be sealed to the rotor 80 by use of a sealing material. Because the wave rotor 80 utilizes many channels spinning at fast speed, the gas/fluid flows entering and exiting the drum 80' through the inlet and outlet/exhaust ports 87 through 90 remain steady with some amount of pulsating feature. However, the flow within a rotor channel is unsteady, dominated by the propagation of compression and expansion waves. Thus, wave rotors can be fitted with conventional steady-flow machines such as typical compressors and turbines.

FIG. 4 shows a known design point operating schematic diagram showing the conditions of a small turboshaft engine 16/14/12 topped by a wave rotor 80. The pressures and temperatures shown are based on a study by Snyder and Fish (Snyder, P. H., Fish, R. E., "Assessment of a Wave Rotor Topped Demonstrator Gas Turbine Engine Concept," ASME Paper 96-GT-41, International Gas Turbine and Aeroengine Congress & Exhibition, Birmingham, UK (Jun. 10-13, 1996)) using the Allison 250 Series Engine as the baseline engine, as disclosed in FIG. 6 of the reference. To allow operating temperatures of turbine blade materials to be within reasonable values, the turbine 16 inlet temperature is held to a baseline engine level (1330° K). However, the burner 12 exit temperature is at a higher level of 1703° K. Meanwhile, the pressure in the burner 12 is increased by the compression ratio of the wave rotor 80; hence, the burner 12 inlet operates at a pressure ratio of 3.37 higher than the compressor 14 discharge. Thus, the burner 12 of the enhanced engine experiences the higher pressures and temperatures than the baseline engine. Gas expansion within the wave rotor 80 experiences a 373° K degree reduction in gas temperature when the burned gas arrives to the turbine 16 inlet section. Despite about a 9% pressure loss across the burner, a 1.24 pressure gain is obtained between the compressor discharge and the turbine inlet. Results of the study indicated a significant performance improvement for the enhanced cycle. The baseline engine produces a nominal 485 KW (650 hp) power at maximum continuous rating with a specific fuel consumption (SFC) of 0.100 (0.59 lbm/hr/hp). Based on the information regarding the conditions given by Snyder and Fish, it has been determined through mathematical modeling that the demonstrator engine 16/14/12 has a predicted 547 kw (733 hp) power with an SFC of 0.076 (0.45 lbm/hr/hp). Thus, application of the wave rotor is predicted to yield a 13% increase in power with a 23% decrease in SFC.

SUMMARY OF THE INVENTION

As an improvement over the prior art systems discussed above, the present invention combines: (i) a wave reformer, such as those described in US 2018/0215615 A1 and sold by New Wave Hydrogen, Inc. (formerly Standing Wave Reformers, Inc.; http://www.NewWaveH2.com), (ii) an optional second wave rotor, and (iii) a gas turbine in a flexible range of novel designs. Such a hybrid power generation system will thermally crack or decompose fuel sources, such as hydrocarbon fuel, to produce fuel products containing mainly hydrogen (e.g., a fuel product containing hydrogen, any unconverted fuel that has not been thermally cracked or decomposed to hydrogen, and any byproducts such as solid particles) and thereby provide a higher thermal efficiency than existing engines with low to no direct emission footprint.

Thus, a new system and method of topping a gas turbine cycle with a wave reformer are described. As a minimum, three separate system configurations are shown in FIGS. 5, 9, and 10, respectively, as non-limiting examples; other system integrations are also possible as a part of this invention with these novel, flexible-design integrations, given the inventive concepts disclosed herein.

These three exemplary, non-exclusive embodiments are referred to as:

Wave Reformer—Integrated in a Turbine System and Producing Fuel to Drive the System (FIG. 5, with exemplary pressures and temperatures shown on FIG. 8), Wave Reformer—Producing Fuel In-Line for Delivery to a Turbine System (FIG. 9), and Wave Reformer—Dual Rotors Integrated in a Turbine System, Producing Fuel and Adding Pressure (FIG. 10).

In one aspect of the invention, the power generation system includes: a combustor or burner having one inlet to receive high-pressure fluid, another inlet to receive high-pressure fuel product, and an output for high-pressure burned gas, where the high-pressure fuel product is combusted; a wave reformer provided with ports with a first port receiving a pressurized, and preferably preheated, fuel source, such as a preheated hydrocarbon fuel, a second port that releases high-pressure fuel product to one of the inputs of the combustor (burner), a third port that receives high-pressure burned gas from the combustor (burner), and a fourth port that exhausts lower-pressure burned gas to the atmosphere or for perhaps other purposes, such as preheating the high-pressure fluid at Stage 1. The wave reformer is configured to cause decomposition of the pressurized, and preferably preheated, fuel source into a high-pressure fuel product including hydrogen, and a turbine operatively connected to the system for generating power.

In another aspect, the invention is to a method of generating power comprising, for example, supplying a high-pressure fuel product to a combustor (burner), then supplying a fuel source, such as a preferably preheated hydrocarbon fuel, to a wave reformer through a first inlet port of a wave reformer device to allow thermal decomposition of the preferably preheated fuel source into a high-pressure fuel product including hydrogen, which is then followed by injecting that high-pressure fuel product, including hydrogen exiting from the wave reformer, to a combustor to allow combustion, and then by directing a major portion of the high-pressure burned gas from the combustor to a turbine to allow for the generation of power, and a lesser portion thereof back to the wave reformer. In operation many of these steps occur simultaneously throughout the power generation process.

BRIEF DESCRIPTION OF THE DRAWINGS

FIG. 1A (prior art) is a schematic showing an implementation of a conventional topping wave rotor in a turbine system.

FIG. 1B (prior art) is a Temperature (T)-entropy (s), T-s, diagram comparing a conventional gas turbine baseline engine and the most common implementation of a conventional topping wave rotor in a turbine system.

DETAILED DESCRIPTION OF THE INVENTION

The fuel source for the power generation system can be any gaseous hydrocarbon fuel (i.e., CxHy) that can be thermally cracked or decomposed into hydrogen. For example, pressurized natural gas from a pipeline can be used. In all of the embodiments disclosed herein the pressurized fuel source at State 6' is preferably preheated prior to its entry into a wave reformer 30 to a temperature sufficient to aid or facilitate an efficient thermal cracking or decomposition of the preheated pressurized fuel in the wave reformer 30 prior to its entry into the wave reformer 30, as exemplified in FIGS. 5, 8, 9, and 10. One way to accomplish preheating of the fuel source is by using a heat exchanger 60 that is connected to the hot gas (i.e., low-pressure exhaust gas at State 5) leaving the turbine 40 from outlet port 42 to preheat the pressurized fuel source as it moves through that heat exchanger (e.g., in the form of pressurized fuel CxHy at State 6') before it enters the wave reformer 30. It should be understood that other ways of preheating the incoming pressurized fuel source are also possible and are understood as being included herein.

Figure 5:
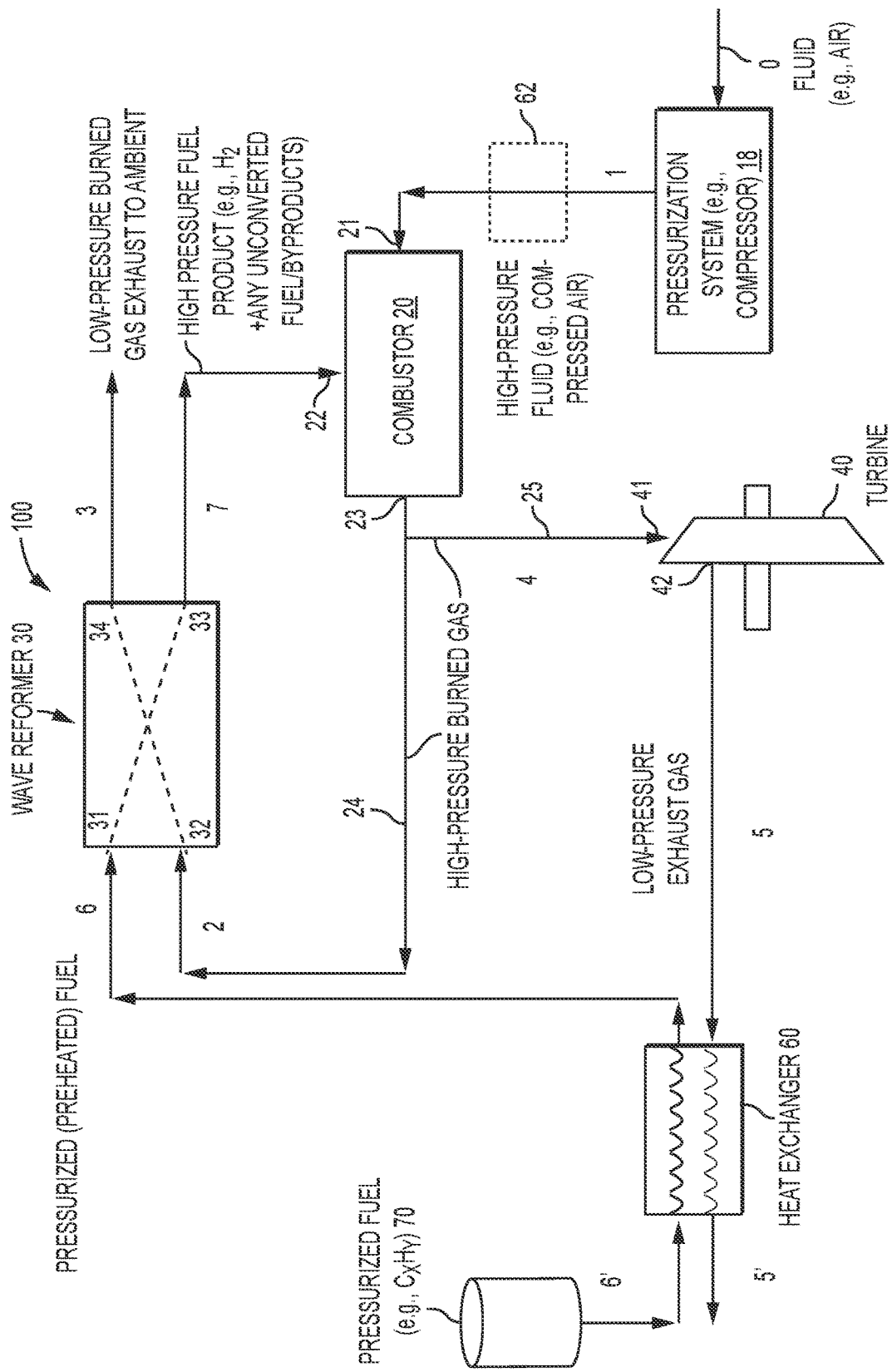
FIG. 5 depicts a first exemplary embodiment according to the present invention, in which a wave reformer is integrated in a turbine system and produces fuel to drive the system.

The turbine engine system shown in FIG. 5 is generally shown at 100 and the elements thereof illustrates a new gas turbine engine cycle and the following will explain how that turbine engine system works. The turbine engine system 100 uses a fluid (e.g., air) at State 0 that is then pressurized using a pressurization system 18 to yield a high-pressure fluid at State 1 (e.g., compressed air). One exemplary set of pressures and temperatures for the fluid, in this case air, are set forth on FIG. 8. The high-pressure fluid is then directed to and enters a burner or combustor 20. It may be desirable in this embodiment, as well as other embodiments and within the scope of the invention, to use a secondary heat exchanger, for example as shown in dotted line at 62, to preheat the high-pressure fluid (e.g., compressed air) at State 1 flowing there through before it enters combustor 20 at an inlet port 21. It would be possible to use the low-pressure burned gas (at State 3) that exits the wave reformer 30 at outlet 34 to feed such a secondary heat exchanger 62 in a manner similar to that shown for heat exchanger 60 that is using the low-pressure exhaust gas being discharged from turbine via outlet 42. In both instances, these now used exhaust gases can eventually be exhausted to the ambient atmosphere. It should be noted, however, that the low-pressure burned gas at State 3 has a much lower flow rate than the high-pressure fluid (e.g., compressed air) stream. This modification could further enhance the turbine engine performance.

Meanwhile, pressurized fuel, such as CxHy provided from a pressurized fuel source 70, at State 6', is preferably preheated heated by a heat exchanger 60 to produce a preheated pressurized fuel at State 6 that is then directed into a wave reformer 30 through a first port 31 on an endplate (not shown in FIG. 5 but indicated as element 35 in FIG. 6) on the inlet side. When the first port 31 aligns with a desired plurality of rotating channels within the wave reformer 30 (similar to channels 84 shown in FIG. 5 of US 2018/0215615 A1), the preheated pressurized fuel at State 6 flows into the desired rotating channels within the wave reformer 30 and is thereby further compressed by at least one shock wave, as will be discussed more fully with reference to FIG. 6. Such a shock compression, unlike in prior art systems in which no reforming occurs in the wave rotor, can amplify the temperature of the preheated pressurized fuel high enough for thermal cracking or decomposition of the pressurized fuel to occur, thus forming a high-pressure fuel product within the wave reformer, that is discharged via outlet port 33 to inlet 22 of the combustor 20. That high-pressure fuel product at State 7 will have hydrogen as a main constituent, along with any unconverted fuel, and any by products, such as solid particulates. The wave reformer's rotor is rotating, and when a channel aligns with a second port 33 on an endplate (not shown in FIG. 5 but indicated as 36 in FIG. 6) on the outlet side, the channel is then exposed to the opened outlet port 33 and the produced high-pressure fuel product leaves the wave reformer 30 through outlet port 33 as a high-pressure fuel product flow. The injection of the high-pressure hot fuel product from the wave reformer 30 to the combustor 20 has another important benefit. Specifically, hot (turbulent) jet ignition or combustion-torch ignition has good potential to enhance ignition reliability and burning rate within combustor 20. Such an ignition method has been studied and employed for internal combustion engines. (See, e.g., Toulson, E., Schock, H., and Attard, W., "A Review of Pre-Chamber Initiated Jet Ignition Combustion Systems," SAE Technical Paper 2010-01-2263 (2010), https://doi.org/10.4271/2010-01-2263).

Figure 2:
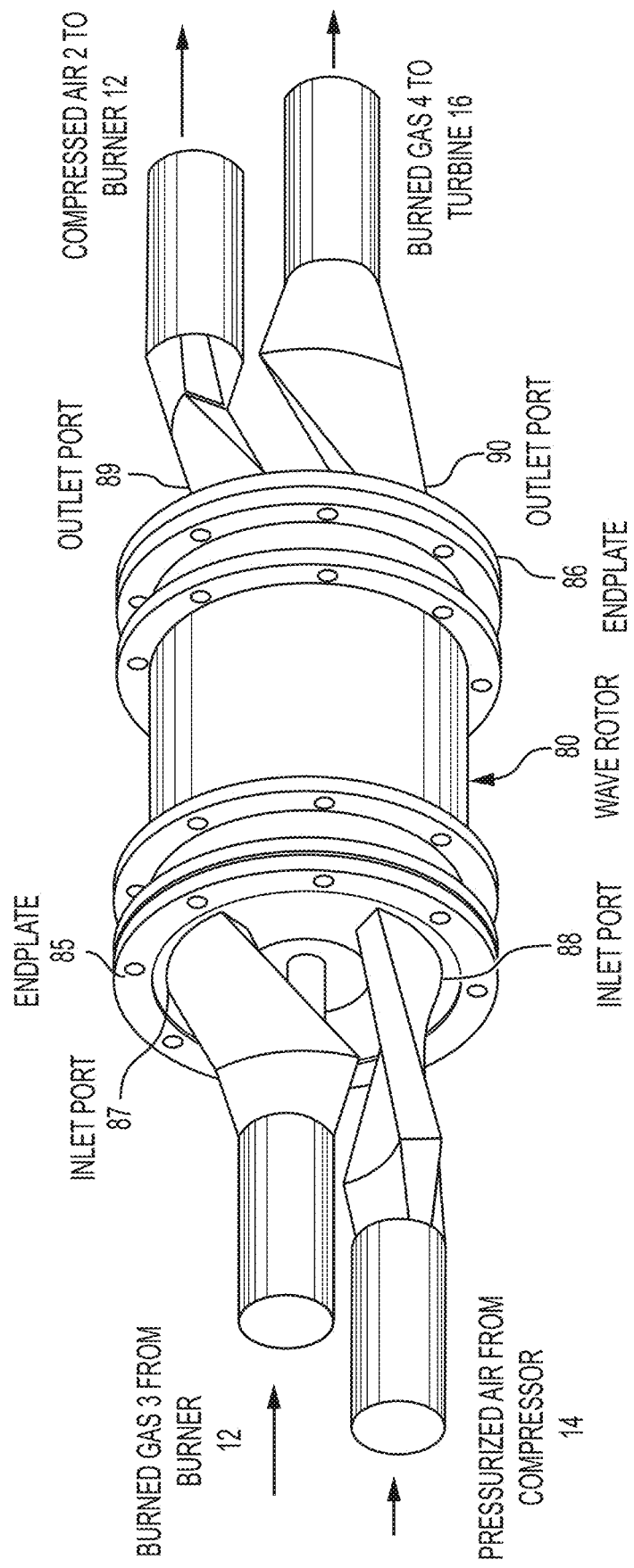
FIG. 2 (prior art) depicts a four-port wave rotor for a gas turbine application.
Figure 3:
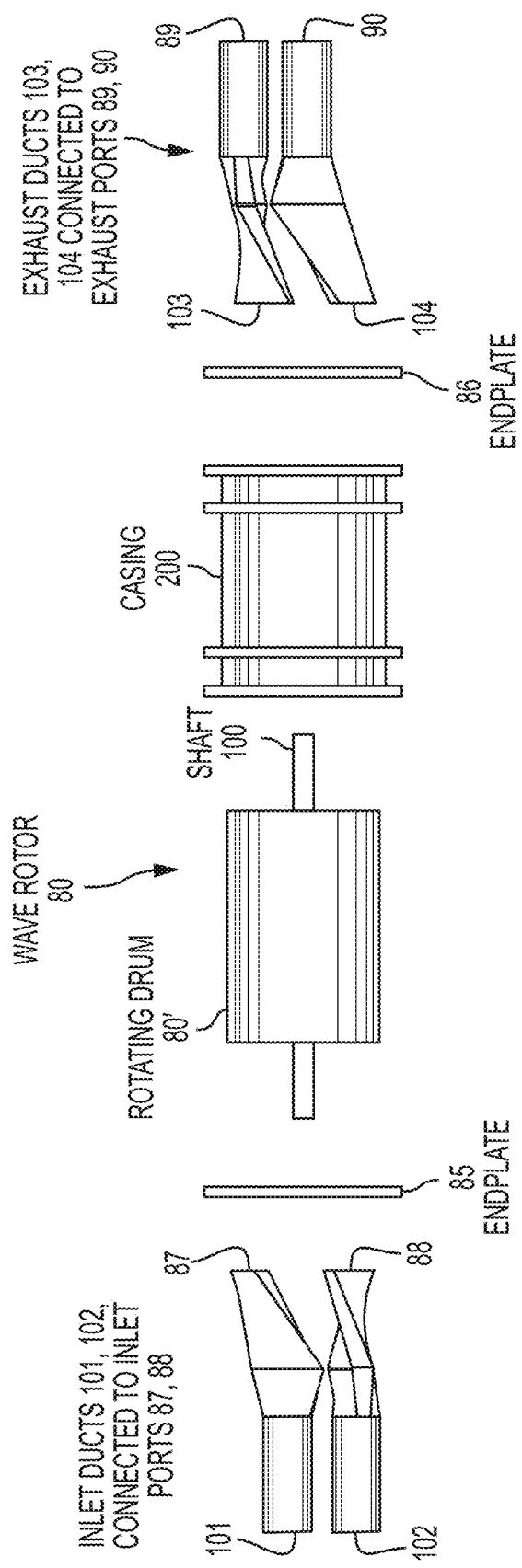
FIG. 3 (prior art) shows an expanded view of the four-port wave rotor of FIG. 2.

After the combustion process within the combustor 20, a high-pressure burned gas is discharged form outlet port 23 and is split and directed along two flow lines 24 and 25. A small portion of the high-pressure burned gas is delivered via a first line 24 as a driver gas back to the wave reformer 30 as a flow of high-pressure burned gas at State 2 through a third port 32 on the endplate 35 (not shown but indicated in FIG. 6) on the inlet side of the wave reformer 30. Therefore, the combustor 20 is connected to the wave reformer 30 both at the inlet port 32 and on the outlet side at outlet port 33. This incoming flow of high-pressure burned gas from the combustor 20 acts as a driver gas that triggers the formation of shock waves in the rotor channels as they rotate that compresses the pressurized fuel which then becomes a driven gas residing in the channels. As the wave reformer 30's rotor spins, the plurality of rotating channels align with a fourth port 34 on the endplate 36 (not shown but indicated in FIG. 6) of the wave reformer 30, and the burned gas trapped within such channels is allowed to expand and exhaust to the ambient atmosphere (State 3). It should be noted that the inlet ports 31 and 32 on endplate 35 and outlet ports 33 and 34 on endplate 36 can be connected to two inlet ducts and two outlet (exhaust) ducts (not shown), respectively, in a manner similar to that shown for the prior art wave rotor 80 in FIG. 3.

The second line 25 also contains a flow of high-pressure burned gas from combustor 20 that is comprised of the remainder of that high-pressure burned gas from combustor 20. This flow comprises the majority of the high-pressure burned gas being discharged from combustor 20. The proportional amounts of high-pressure burned gas being moved through lines 24 and 25 can be regulated in a number of ways, for example, including using different sized lines or by flow regulators, so long as each of the wave reformer 30 and combustor 20 are receiving their desired portions of the high-pressure burned gases. Line 25 delivers its supply of high-pressure burned gas flow at State 4, to inlet port 41 of the engine turbine 40. After work extraction in the turbine 40, the exhaust gas from the turbine 40 exits via outlet port 42 as a low-pressure exhaust gas at State 5, and as shown can be sent into and through heat exchanger 60 to heat incoming pressurized fuel from fuel source 70.

Flows through lines 24 and 25, at States 2 and 4, from combustor 20 have the same thermodynamic properties, but their mass flow rates are different. As noted previously, only a small part of the high-pressure burned gas exiting combustor 20 is delivered to inlet port 32 of the wave reformer 30 as a driver gas, and this will be further discussed with reference to FIG. 6. The work output of the engine system 100 is provided by the turbine 40 using the majority of the high-pressure burned gas at State 4 feeding into the turbine 40. Therefore, in this novel system 100, the wave reformer 30 provides substantially a clean high-pressure hydrogen-containing fuel product at State 7 for use by the combustor 20. This arrangement provides a way of replacing use of current fuel sources for turbine engines while maintaining their cycle performance, and is a new application of wave rotors as wave reformers in stationary gas turbine power generation systems by producing a hydrogen-containing fuel as an integrated part of the turbine system.

In other designs, the wave reformer 30 may have more than four ports, depending on the system components and configuration. The number and azimuthal locations of the wave reformer's ports are set to effect fuel reforming quality. For example, six-port and eight-port wave reformers provide greater fuel-to-$H_2$ conversion than classic four-port configuration.

Figure 6:
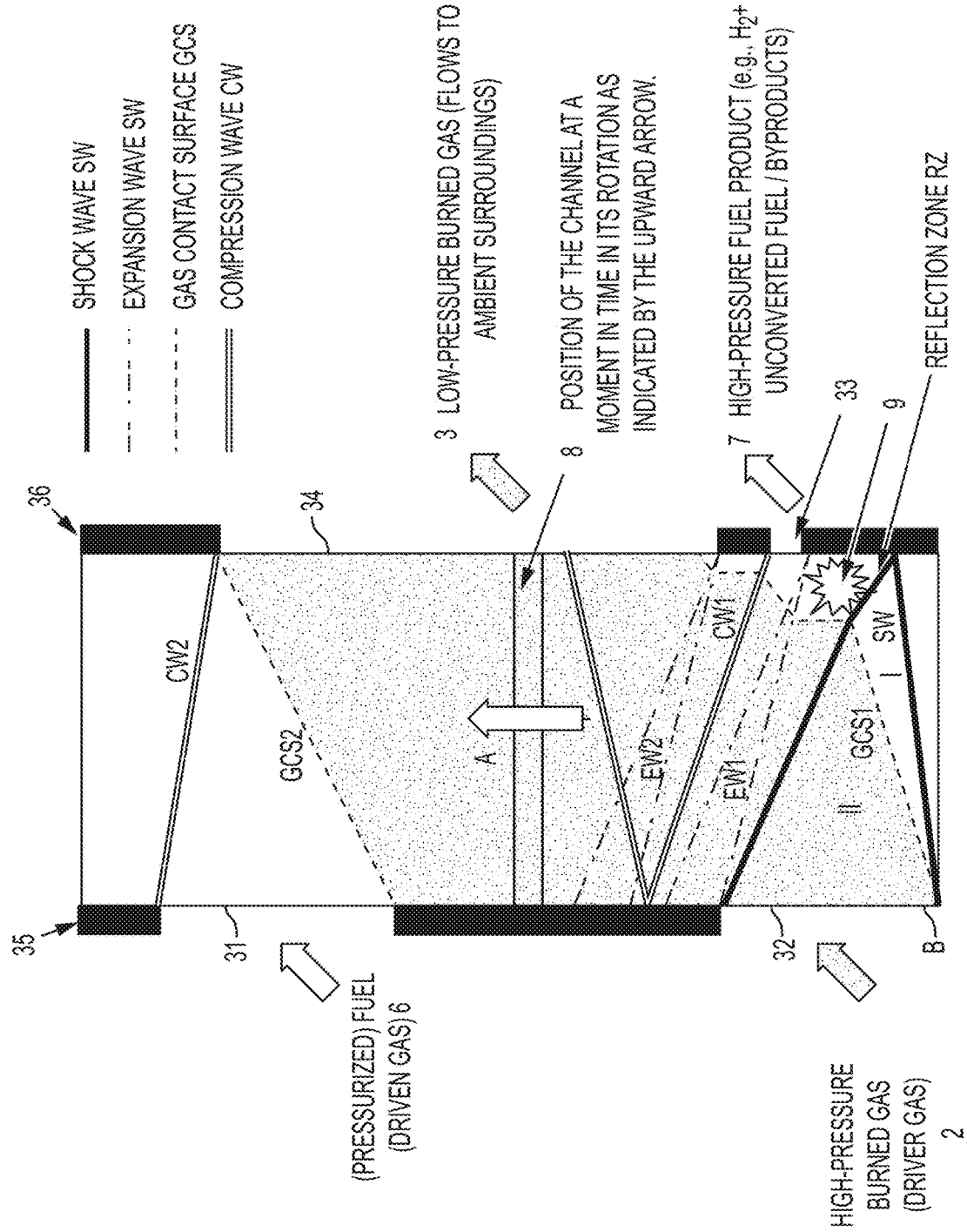
FIG. 6 shows a wave diagram of the proposed wave reformer topping cycle in accordance with the invention.

To explain the physical phenomena occurring in the channels and understand the invention, a wave diagram as depicted in FIG. 6 will be discussed in this section. Wave diagrams are commonly used in the art and are helpful to visualize the unsteady flow process occurring in the channels. The wave diagram is constructed by conceptually unwrapping the wave reformer's channels in an x-t (distance-time) or x-θ (distance-circumferential angle) domain. It displays a time-history of the flow in any single wave reformer passage as it moves through the wave reformer cycle. Since the same things occur in each of the wave reformer's channels, the operation can best be understood by explaining what happens in one wave reformer channel during one complete revolution of the wave reformer's rotating drum (as similarly depicted as rotating drum 80' in FIG. 3). This FIG. 6 diagram can also be viewed as an instantaneous snapshot of the flow in the entire wave reformer with the rotational motion of the wave reformer's channels is represented by straight translatory motion (i.e., unwrapped view of the reformer). Thus, FIG. 6 schematically illustrates an unwrapped demonstration of a through-flow wave reformer as an example, with only one channel shown at a moment in time represented by position 8 moving upward in a direction A. The FIG. 6 wave diagram portrays the annular arrangement of the inlet ports (31, 32) and outlet ports (33, 34), solid walls reflecting the endplates 35 and 36, the wave fronts, and gas interfaces during each phase of the cycle, which is useful in visualizing the processes occurring in a single cycle of a wave reformer. It should be understood that the top of each wave diagram is looped around and joined to the bottom of the same diagram, i.e. each wave cycle is repetitive. The vertical solid line segment on the left side of the channel, as shown in position 8, represents the stationary endplate 35 location around the circumference when the inlet ports 31 and 32 are closed. The diagonal lines represent the propagation lines (or trajectories) of the waves and contact surfaces (interfaces between the fluids). Wave interactions at interfaces are ignored. Each cycle consists of two inflow ports 32 and 31, where ingress of the fresh driver and driven fluids at States 2 and 6, respectively, are fed into the moving channel, and two outflow ports 33 and 34, where the energized-driven gas at State 7 and de-energized driver gas at State 3, respectively, are discharged from the wave reformer channel. In the following sections, the events occurring in a channel during one complete cycle will be described and it will be described in detail how shock and expansion waves are effectively employed to transfer the energy directly between the gases and achieve the cracking and decomposition of the pressurized and preferable preheated fuel into a high-pressure fuel product including hydrogen.

FIG. 6 represents, as noted, a moment in time in the rotation of a channel as represented by position 8, an unwrapped four-port, through-flow wave reformer where the rotor channel is moving upward as indicated by arrow A. The journey of a channel in the wave reformer is periodic.

The process begins on the left at B of the wave diagram where the flow within the channel would be entirely filled with the pressurized fuel as the driven gas (e.g., a preheated hydrocarbon fuel at State 6. At this instance, the outlet ports 33 and 34 on endplate 36 would be closed and the high-pressure burned driver gas inlet port 32 on endplate 35 would suddenly open. When the high-pressure burned driver gas inlet port 32 opens, the high-pressure burned driver gas from combustor 20 would enter the channel and a primary shock wave SW would be generated by a pressure difference between the high-pressure burned gas coining in at the inlet port 32 and the relatively lower pressure driven gas already in the channel. This first or primary shock wave SW travels rightwards (as represented by the bottom-most solid line SW), thereby compressing the driven gas. The primary shock wave SW runs through the channel at a speed faster than the speed of sound and causes an abrupt rise of pressure. Behind the primary shock wave SW is a boundary or gas contact surface GCS1 (represented by a dotted line) separating the high-pressure burned driver gas in area II from the compressed pressurized driven gas in area I. In the depicted time history, this gas contact surface or boundary GCS1 follows the primary shock wave SW to the right at a rate slower than the movement of the primary shock wave SW. The shock wave SW arrives at the right end of the channel and is reflected away from an end wall of endplate 36. The reflected shock wave SW then propagates left, further increasing the pressure and temperature of the pressurized driven gas in the reflection zone RZ behind the primary wave. The reflected shock wave SW continues propagating to the channel's left end, stopping the motion of the double-compressed driven gas and the driver gas indicated by the now changed vertically extending shape of the gas contact surface GCS1 where on the right side the pressurized driven gas extends vertically along endplate 36 as time continues. The peak temperature in the reaction zone depends on the initial temperature of the pressurized driven gas and Mach number of the primary shock wave SW. With sufficient compression by the primary and reflected shock waves, the peak temperature and consequently thermal dissociation or decomposition of the high-pressure fuel to hydrogen occurs in the reflection zone RZ prior to opening the exit port 33 by further rotation of the channel Sufficient residence time for fuel pyrolysis can be provided by adjusting the wave reformer's rotor speed, the rotor length, and flow conditions. The residence time for this peak temperature in which decomposition occurs only lasts for a sufficient time before opening the outlet port 33. When on the right end of the channel the outlet port 33 opens suddenly, a fan like expansion wave EW1 (dashed-dotted line) is generated from and propagates to the left from the lower corner of the now opened outlet port 33 as is shown in FIG. 6. The leftward movement of expansion wave EW1 reduces the pressure of the now processed driven gas and expels the decomposed gas through the exit port 33 (State 7) heading for to the combustor 20 via inlet port 22. Closing of the high-pressure burned driver inlet port 32 is timed with the arrival of the expansion wave EW1 front boundary at the channel's left end. Meanwhile, upon the closing the exit port 33, a very small amount of processed driven gas will be retained or stays un-expelled in the channel, as is shown by the small amount of the processed driven gas that extends vertically along and adjacent the endplate wall 36 above outlet port 33. The compression wave, or a hammer shock, CW1 (doubled solid line) is generated from the upper corner of the exit port 33, propagating to the left. When a channel end is suddenly closed which has a moving gas in it, a compression wave is formed that propagates into the channel to stop the gas motion upstream, or stopping the channel flow. In this case, the flow movements are stopped vertically (in time). That is why GCS1 again becomes vertical right after the port 33 closes. At this very moment, this retained driven gas trapped in the channel is made up of a large part of the high-pressure burned gas and a very small portion of the double-compressed, processed gas, preventing the hot high-pressure burned gas from reaching the outlet port 33 or contacting the right end wall of endplate 36.

The entire amount of the high-pressure burned driver gas is exhausted to the ambient surrounding (State 3) by opening the exhaust gas port 34 (by rotation of the channel), and this exhausting is facilitated by another expansion wave EW2 generated from the leading corner of the exhaust port 34 as FIG. 6 demonstrates. By opening the pressurized driven gas entry port 31 (State 6), the preheated pressurized fuel entering the channel from the left is separated by another contact surface GCS2 which acts as a boundary relative to the expanded burned gas leaving the channel from right, i.e. an overlap process. While the overlap process continues, the scavenging of the remaining high-pressure burned driver gas through the exit port 34 is stopped by closing the exhaust port 34. The closing of the exhaust port 34 is timed with the arrival of the pressurized driven gas to the right end of the channel Closing the exhaust port 34 generates another compression wave CW2, or another or second hammer shock, that propagates to the left stopping the incoming preheated fuel and increasing its pressure and temperature slightly. When the compression wave CW2 meets the upper corner of the inlet port 31, the timing is such that inlet port 31 closes, leaving the channel fully filled with fresh pressurized driven gas/fuel and the next cycle can be initiated.

Figure 4:
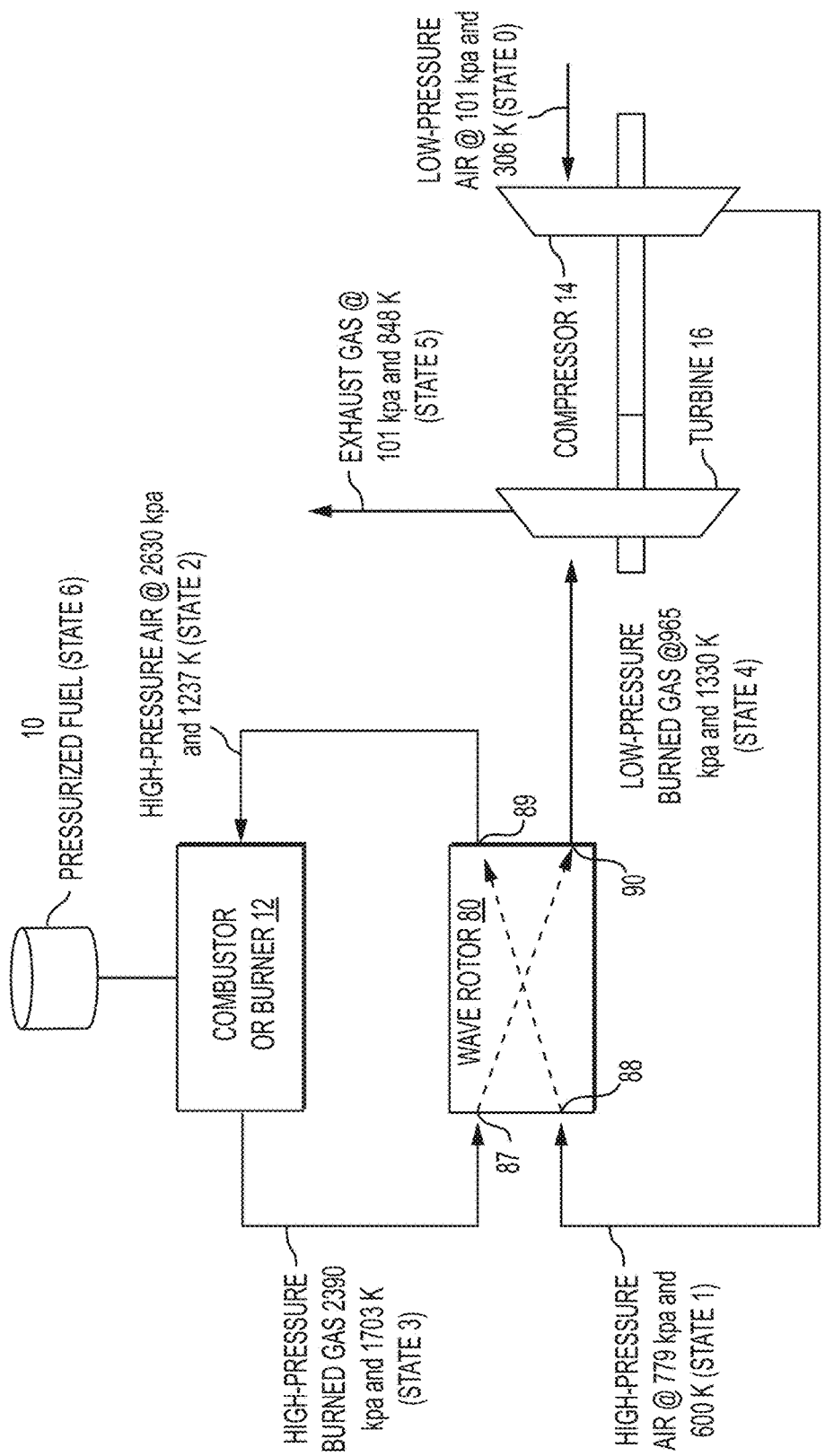
FIG. 4 (prior art) schematically shows a design point cycle conditions of a conventional rotor system as described in Snyder and Fish.
Figure 7:
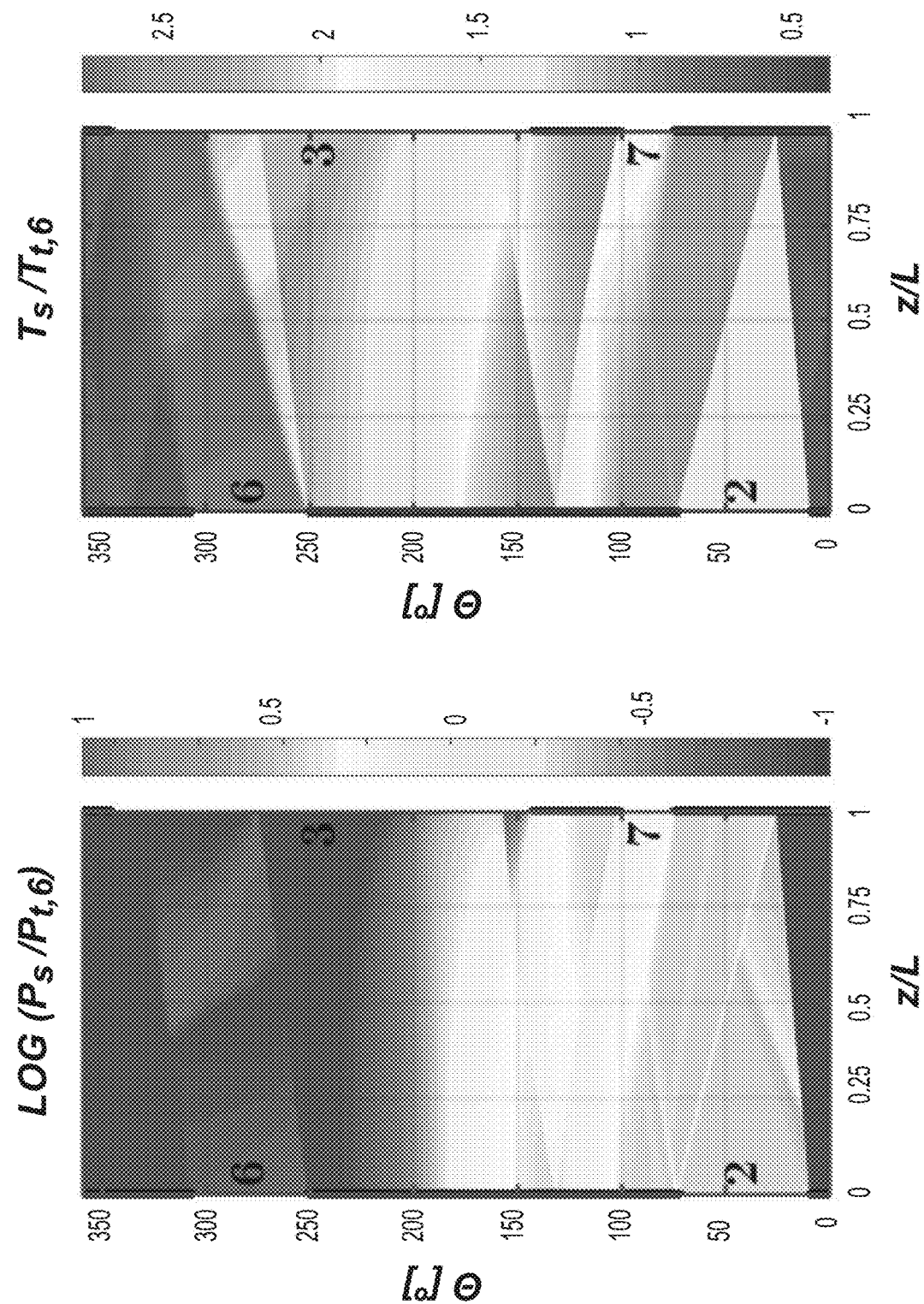
FIG. 7 represents a numerical modeling of a wave reformer implementation of FIG. 5 using the Allison 250 Series Engine data introduced in FIG. 4.

FIG. 7 represents a numerical modeling of a wave reformer implementation described in FIG. 5 using the Allison 250 Series Engine data introduced in FIG. 4. In this preliminary modeling, air is used as driver and driven gases. The different gray-scale contours show non-dimensional pressure and temperature in a representative channel, as a function of time (vertical axis) and position (horizontal) over one complete cycle of operation. A gray scale bar is provided to the immediate right of each contour plot. Axial distance is non-dimensionalized by channel length, L. Vertical axis represented by angular displacement. The pressure and temperature are non-dimensionalized by the inlet stagnation state properties. The pressure plot is shown on a logarithmic scale in order to highlight wave strengths. Regions of high-temperature and high-pressure are seen in both plots due to compression by shock waves consistent with discussions in FIG. 6.

Figure 8:
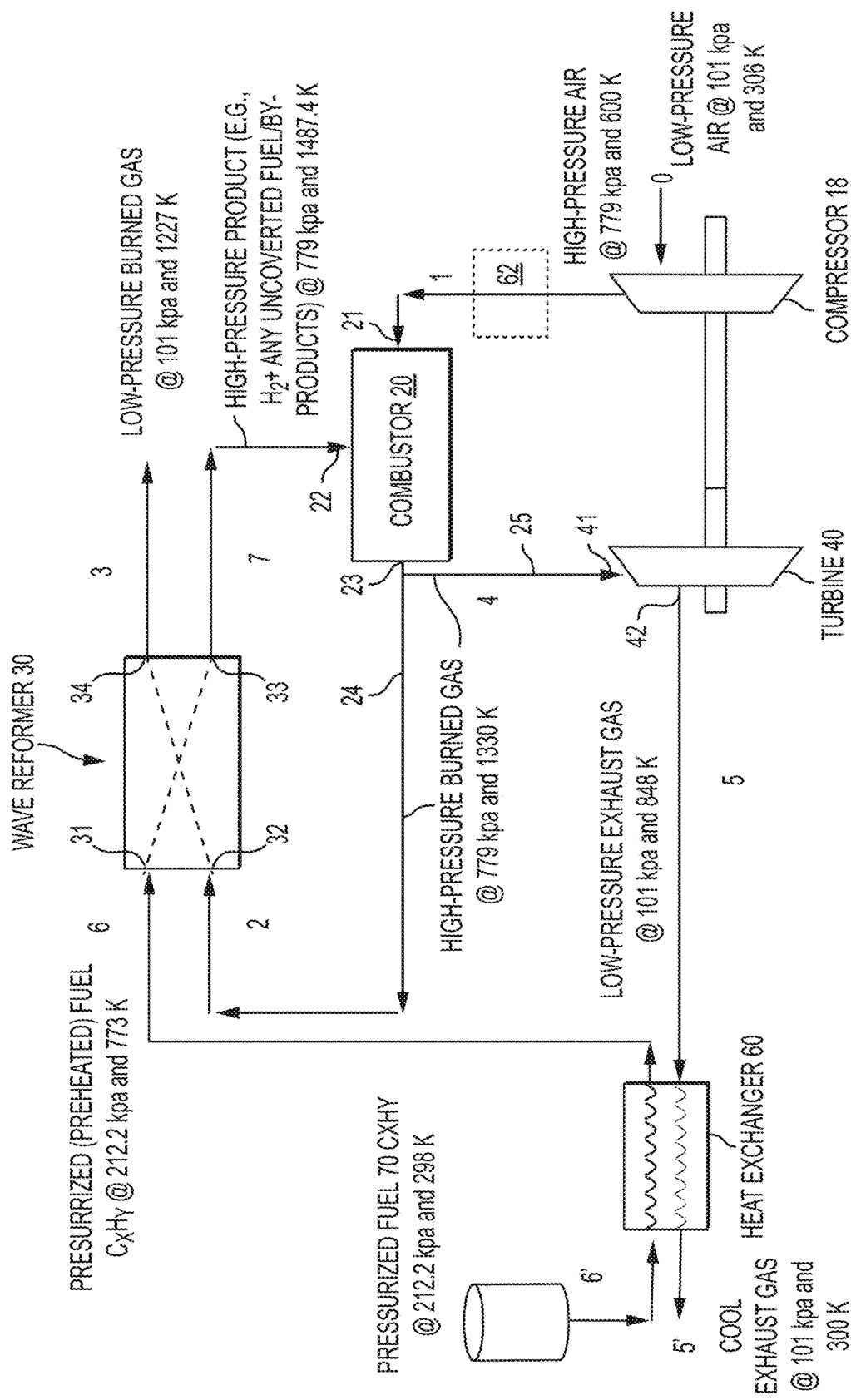
FIG. 8 shows typical pressures and temperatures calculated at the inlet and exit ports of the wave reformer and throughout the whole system.

FIG. 8, which complements FIG. 5, sets forth the results of numerical modeling which has predicted the noted operating conditions of the wave reformer implemented in accordance with the embodiment of FIG. 5 and using the Allison 250 Series Engine as the baseline engine. FIG. 8 shows pressures and temperatures calculated at the inlet and exit ports of the wave reformer. Mass flow rates of 0.0.0564 kg/s and 0.1079 kg/s are predicted for the driven fuel gas at the inlet (State 6) and exit (State 7) of the wave reformer, respectively. For this specific design, the rotor length is considered 0.5 in rotating at 7000 RPM. The channel height and width of each channel is selected as 1.27 cm. Mass flow rates of 0.2810 kg/s and 0.2305 kg/s are predicted for the driver burned gas at the inlet (State 2) and exit (State 3) of the wave reformer, respectively.

Figure 9:
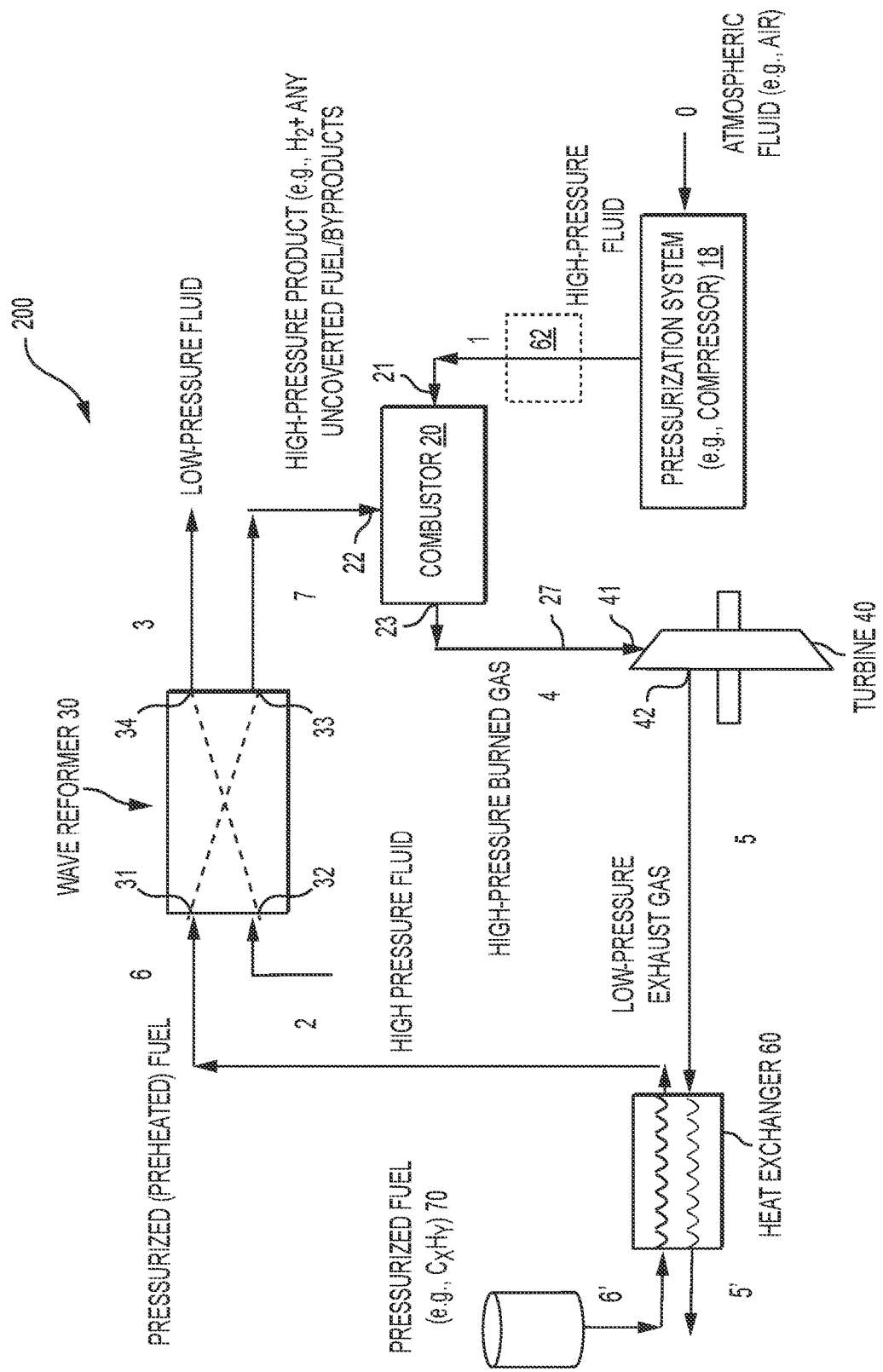
FIG. 9 depicts a second exemplary embodiment according to the present invention, in which a wave reformer produces fuel in line for delivery to a turbine system.
Figure 10:
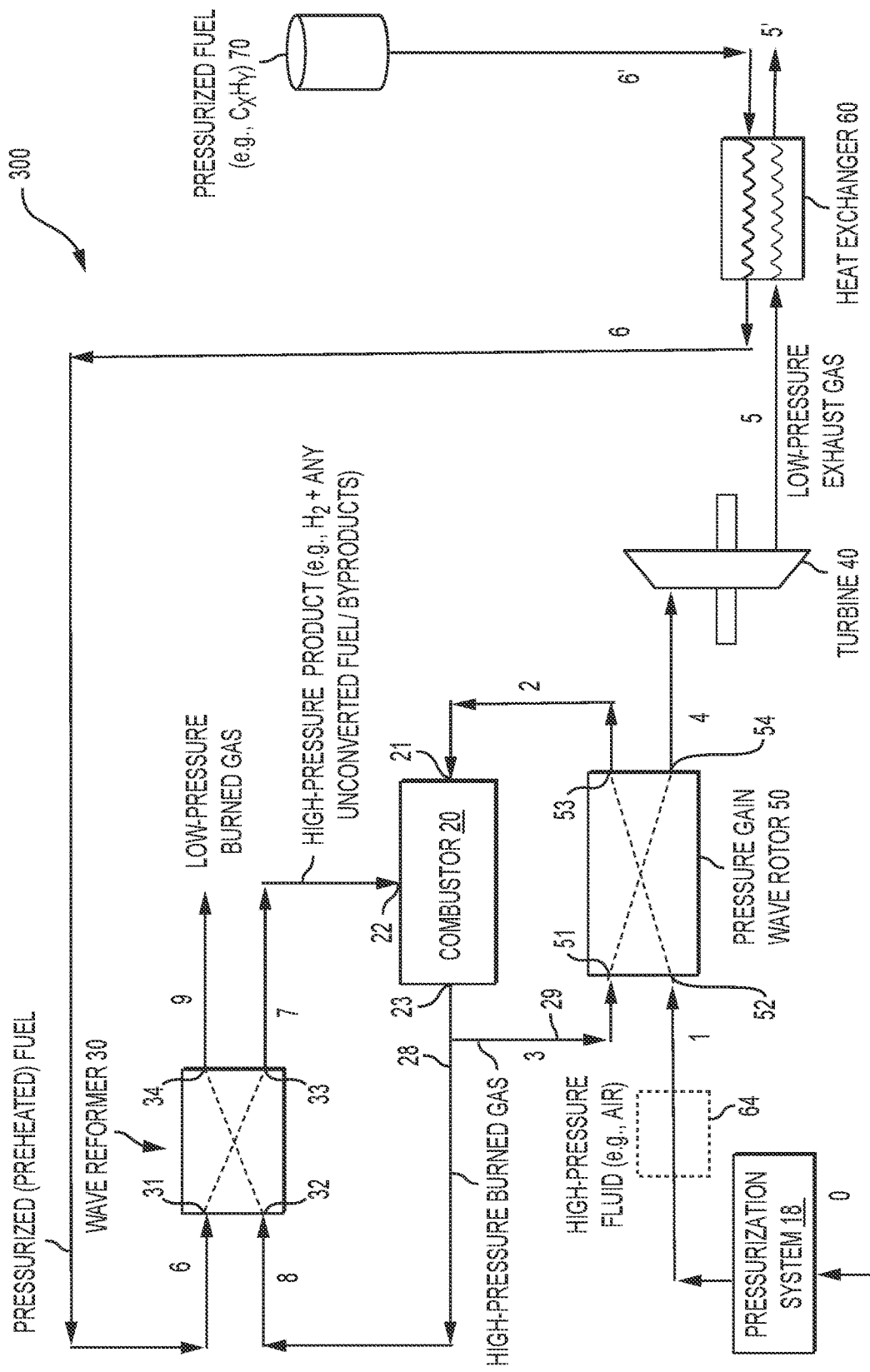
FIG. 10 depicts a third exemplary embodiment according to the present invention, in which dual rotors are integrated into a turbine system, one operating as a reformer to a fuel product containing hydrogen, any unconverted fuel, and any byproducts such as solid particles, and the other acting as a rotor adding pressure.

FIG. 9 shows second exemplary turbine engine system generally shown at 200 according to the invention where the wave reformer 30 acts as a hydrogen-containing fuel production unit only. The wave reformer 30 is supplied at inlet port 31 with pressurized fuel from a source 70 and again it is preferably preheated. The wave reformer 30 is not supplied with a high-pressure burned gas, but rather with a high-pressure fluid, such as natural gas which can have pipeline pressures of 40-70 atm. The combustor 20 continues to receive high-pressure fuel product from the wave reformer 30 at inlet port 22 and high-pressure air is still received from compressor 18 at inlet port 21. Turbine 40 also still discharges a low-pressure exhaust gas that can provide heat to heat exchanger 60. In this simpler arrangement, the conventional fossil fuel used in gas turbine engines is replaced by the hydrogen-containing fuel produced in the wave reformer 30. The new arrangement allows for a cleaner burning system with lower greenhouse gas emission. In the embodiments of FIGS. 9 and 10, the compression and expansion described for the wave diagram in FIG. 6 remain the same.

In examples of different configurations, there could be one or two additional compressors added to the system. A first compressor could be used for supplying high pressure air. In addition, or alternatively, a second compressor could be used for providing high pressure natural gas or methane.

FIG. 10 shows a third exemplary turbine engine system generally shown at 300 according to the invention, and the elements thereof illustrate another new gas turbine engine system. This system 300 is similar to the system 100 of FIG. 5, with the same descriptions, except that here a wave reformer 30 and a larger-scale wave rotor 50 are both used in the system 300. The larger-scale wave rotor 50 has inlet ports 51 and 52 and outlet ports 53 and 54. At inlet port 51 the wave rotor 50 receives a flow, State 3, of high-pressure burned gas from combustor 20, and high-pressure fluid flow in at inlet port 52, State 1. At outlet port 53, State 2, compressed air is discharged back to the combustor and at outlet port 54, State 4, burned gas, which has been expanded in the wave rotor 50, is discharged to turbine 40 at inlet 41. The net effect of placing a wave rotor is to create a pressure gain between the compressed liquid (State 1) and turbine inlet (State 4) and the wave reformer 30 provides hydrogen-containing product as fuel for the system. The burned gas supplied to the turbine 40 by the first wave rotor 50 is delivered at higher pressure than in other power generation system arrangements. This arrangement results in a more efficient and cleaner burning power generation system.

We claim:

1. A power generation system comprising:
a combustor having a first inlet to receive a high-pressure fluid, a second inlet receiving a high-pressure fuel product, and an output port discharging high-pressure burned gas, wherein the high-pressure fuel product is combusted;
a wave reformer having a first port receiving a pressurized fuel, a second port discharging a high-pressure fuel product to the second inlet of the combustor, a third port receiving at least a first portion of the high-pressure burned gas being discharged from the combustor, and a fourth port exhausting a lower pressure burned gas, said wave reformer being configured to cause thermal decomposition of the pressurized fuel; and
a power generating turbine having a first inlet receiving at least another portion of the high pressure burned gas discharged from the combustor and exhausting a low pressure exhaust gas.

2. The power generation system of claim 1 further comprising a first compressor connected to the combustor supplying the high pressure fluid.

3. The power generation system of claim 1, wherein the wave reformer has either four, five, six, seven or eight ports.

4. The power generation system of claim 1, wherein the wave reformer receives pressurized methane gas in a first port.

5. The power generation system of claim 1, wherein hydrogen gas is produced by the wave reformer as a portion of the high-pressure fuel product.

6. The power generation system of claim 1, wherein hydrogen gas is discharged as a portion of the high-pressure fuel product from the second port of the wave reformer and supplied to the combustor.

7. The power generation system of claim 1, wherein the pressurized fuel comprises hydrocarbon fuel, and the wave reformer thermally decomposes the hydrocarbon fuel to produce a high-pressure fuel product including hydrogen.

8. The power generation system according to claim 1, further comprising a heat exchanger to preheat said pressurized fuel prior to being input to the wave reformer.

9. The power generation system according to claim 8, wherein said heat exchanger uses hot gases exhausted from the turbine to preheat said pressurized fuel.

10. The power generation system according to claim 1, further comprising a heat exchanger to heat said high pressure fluid.

11. The power generation system according to claim 10, wherein said heat exchanger uses said lower pressure burned gas exhausted from said wave reformer.

12. A power generation system comprising:
a first compressor, wherein air is pressurized;
a source of pressurized and preheated methane;
a combustor having a first inlet to receive high-pressure air operably connected to the first compressor, a second input to receive high-pressure hydrogen-containing gas, and an outlet for discharging high-pressure burned gas, wherein hydrogen gas is combusted;
a wave reformer having a first port receiving the preheated pressurized methane gas, a second port releasing high-pressure hydrogen-containing gas to the second input of the combustor, a third port receiving t least a first portion of high-pressure burned gas discharged from the combustor, and a fourth port exhausting lower pressure burned gas; and
a power generating turbine operatively connected to the outlet of the combustor and receiving at least a second portion of the discharged high-pressure hydrogen-containing gas.

13. The power generation system of claim 12 further comprising a pressure gain wave rotor.

14. The power generation system of claim 12 further comprising a pressure gain wave rotor positioned between the combustor and the turbine for supplying energy to the turbine.

15. A method of generating power comprising the steps of:

supplying high-pressure fluid to a combustor;

supplying a pressurized preheated fuel to a wave reformer through a first inlet port thereof, supplying a first portion of high-pressure burned gas discharged from the combustor to a second inlet port of the wave reformer and forming a shock wave in the wave reformer to drive thermal decomposition of the pressurized preheated fuel into a high-pressure fuel product including hydrogen;

injecting the high-pressure fuel product including hydrogen discharged from a first exit port of the wave reformer into the combustor to allow combustion thereof to occur therein; and directing at least a second portion of high-pressure burned gas discharged from the combustor to a turbine to allow generation of improved power therefrom.

16. A method according to claim 15, further comprising a step of adding a wave rotor upstream to the turbine and the additional steps of directing a high-pressure fluid into a first inlet port of the wave rotor, directing the said at least a second portion of high pressure burned gas discharged from the combustor into a second inlet port of the wave rotor, forming a shock wave in the wave rotor, exhausting a high-pressure burned gas from a first exhaust port of the wave rotor to the turbine, and creating a pressure gain between the high-pressure fluid and an inlet of said turbine.

17. A method according to claim 16, including the additional step of discharging compressed air from a second exhaust port of the wave rotor and directing the compressed air to an inlet of the combustor.

18. A method according to claim 15, wherein pressurized preheated fuel is a hydrocarbon.

19. A method according to claim 15, wherein said fuel source is preheated by a heat exchanger that uses the hot gases exhausted from said turbine.

* * * * *